United States Patent
Natsui et al.

(10) Patent No.: US 10,833,322 B2
(45) Date of Patent: Nov. 10, 2020

(54) POSITIVE ELECTRODE ACTIVE MATERIAL CONTAINING LITHIUM COMPOSITE OXIDE AND LITHIUM COMPOSITE OXYFLUORIDE, AND BATTERY INCLUDING POSITIVE ELECTRODE CONTAINING POSITIVE ELECTRODE ACTIVE MATERIAL

(71) Applicant: Panasonic Intellectual Property Management Co., Ltd., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 297 days.

(21) Appl. No.: 15/844,626

(22) Filed: Dec. 18, 2017

(65) Prior Publication Data
US 2018/0205073 A1    Jul. 19, 2018

(30) Foreign Application Priority Data
Jan. 19, 2017 (JP) ................ 2017-007183

(51) Int. Cl.
| | |
|---|---|
| H01M 4/36 | (2006.01) |
| H01M 10/0562 | (2010.01) |
| H01M 10/0525 | (2010.01) |
| H01M 4/131 | (2010.01) |
| H01M 4/62 | (2006.01) |
| H01M 4/505 | (2010.01) |
| H01M 4/02 | (2006.01) |
| H01M 4/525 | (2010.01) |
| H01M 4/1315 | (2010.01) |

(52) U.S. Cl.
CPC ......... *H01M 4/366* (2013.01); *H01M 4/131* (2013.01); *H01M 4/364* (2013.01); *H01M 4/628* (2013.01); *H01M 10/0525* (2013.01); *H01M 10/0562* (2013.01); *H01M 4/1315* (2013.01); *H01M 4/505* (2013.01); *H01M 4/525* (2013.01); *H01M 2004/028* (2013.01); *H01M 2300/0065* (2013.01)

(58) Field of Classification Search
CPC ...... H01M 4/366; H01M 4/364; H01M 4/131; H01M 4/628; H01M 4/505; H01M 4/525; H01M 4/1315; H01M 10/0562; H01M 10/0525; H01M 2004/028; H01M 2300/0065
See application file for complete search history.

(56) References Cited

U.S. PATENT DOCUMENTS

| | | | |
|---|---|---|---|
| 6,037,095 A | 3/2000 | Miyasaka | |
| 6,416,902 B1 | 7/2002 | Miyasaka | |
| 6,872,491 B2 | 3/2005 | Kanai et al. | |
| 7,429,434 B2 | 9/2008 | Mihara et al. | |
| 8,741,484 B2 | 6/2014 | Karthikeyan et al. | |
| 9,178,249 B2 | 11/2015 | Amine et al. | |
| 2002/0022183 A1 | 2/2002 | Ogawa et al. | |
| 2002/0055042 A1 | 5/2002 | Kweon et al. | |
| 2004/0202938 A1 | 10/2004 | Noguchi et al. | |
| 2004/0229123 A1 | 11/2004 | Takahashi et al. | |
| 2005/0084757 A1 | 4/2005 | Kweon et al. | |
| 2009/0136854 A1 | 5/2009 | Nakura | |
| 2009/0202892 A1 | 8/2009 | Inagaki et al. | |
| 2010/0086854 A1 | 4/2010 | Kumar et al. | |
| 2011/0247321 A1 | 10/2011 | Streeter et al. | |
| 2011/0294019 A1 | 12/2011 | Amine et al. | |
| 2013/0136987 A1 | 5/2013 | Uehara et al. | |
| 2013/0209871 A1 | 8/2013 | Kato et al. | |
| 2013/0266868 A1 | 10/2013 | Sun et al. | |
| 2014/0099549 A1 | 4/2014 | Ceder et al. | |
| 2014/0127583 A1 | 5/2014 | Han et al. | |
| 2014/0162127 A1 | 6/2014 | Kim et al. | |
| 2014/0205913 A1 | 7/2014 | Park et al. | |
| 2014/0272607 A1 | 9/2014 | Amine et al. | |
| 2015/0010819 A1 | 1/2015 | Lee et al. | |
| 2015/0090924 A1 | 4/2015 | Lee et al. | |
| 2015/0093646 A1 | 4/2015 | Kawada | |
| 2015/0214550 A1 | 7/2015 | Song et al. | |

(Continued)

FOREIGN PATENT DOCUMENTS

| | | |
|---|---|---|
| CN | 103928672 A | 7/2014 |
| EP | 2921455 A1 | 9/2015 |

(Continued)

OTHER PUBLICATIONS

ICSD Details on Search Result for Li2 (Mn O3), printed on Feb. 4, 2020.

Coban, Hüseyin Can Çoban, "Metal Oxide (SnO2) Modified LiNi0.8Co0.2O2 Cathode Material for Lithium Ion Batteries," M.Sc. Thesis, Department of Nano Science and Nano Engineering, Nano Science and Nano Engineering Programme, Istanbul Technical University Graduate School of Science Engineering and Technology. May 2014.

(Continued)

*Primary Examiner* — Laura Weiner
(74) *Attorney, Agent, or Firm* — McDermott Will & Emery LLP

(57) ABSTRACT

A positive electrode active material contains a lithium composite oxide and a lithium composite oxyfluoride. The lithium composite oxyfluoride covers at least part of the surface of the lithium composite oxide. The lithium composite oxyfluoride is represented by a composition formula $Li_\alpha Me2_\beta O_\gamma F_\delta$, where Me2 represents at least one selected from the group consisting of Mn, Co, Ni, Fe, Al, Cu, V, Nb, Mo, Ti, Cr, Zr, Zn, Na, K, Ca, Mg, Pt, Au, Ru, and W; and $1.0 \leq \alpha \leq 2.1$; $0.8 \leq \beta \leq 1.3$; $1.5 \leq \gamma \leq 2.9$; and $0.1 \leq \delta \leq 1.5$. The crystal structure of the lithium composite oxyfluoride belongs to space group Fm-3m.

12 Claims, 3 Drawing Sheets

(56) References Cited

U.S. PATENT DOCUMENTS

| | | |
|---|---|---|
| 2015/0228970 A1 | 8/2015 | Song et al. |
| 2015/0380768 A1 | 12/2015 | Mizuno et al. |
| 2016/0013517 A1 | 1/2016 | Nakazawa et al. |
| 2016/0049640 A1 | 2/2016 | Takeuchi et al. |
| 2016/0372747 A1 | 12/2016 | Rolff et al. |
| 2017/0005332 A1 | 1/2017 | Chen et al. |
| 2017/0207444 A1 | 7/2017 | Yanagihara et al. |
| 2019/0088940 A1 | 3/2019 | Ceder et al. |

FOREIGN PATENT DOCUMENTS

| | | |
|---|---|---|
| JP | H01-209663 A | 8/1989 |
| JP | H07-037617 A | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 | 1/2002 |
| JP | 2003-229130 A | 8/2003 |
| JP | 3578066 B2 | 10/2004 |
| JP | 2004-311408 | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 | 6/2014 |
| JP | 2015-022958 A | 2/2015 |
| JP | 2015-069754 A | 4/2015 |
| JP | 2015-111551 A | 6/2015 |
| JP | 2015-118892 A | 6/2015 |
| JP | 2015-128023 A | 7/2015 |
| JP | 2015-159109 A | 9/2015 |
| JP | 2016-033902 | 3/2016 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

The Extended European Search Report dated Jun. 1, 2018 for the related European Patent Application No. 16827416.5.

Ayuko Kitajou et al: "Electrochemical Performance of a Novel Cathode material "LiFeOF" for Li-ion Batteries", Electrochemistry, vol. 83, No. 10, Jan. 1, 2015 (Jan. 1, 2015), pp. 885-888, XP055416459.

International Search Report of PCT application No. PCT/JP2016/003215 dated Sep. 20, 2016.

International Search Report of PCT application No. PCT/JP2017/027997 dated Sep. 26, 2017.

International Search Report of PCT application No. PCT/JP2016/003954 dated Dec. 6, 2016.

International Search Report of PCT application No. PCT/JP2016/003949 dated Nov. 29, 2016.

International Search Report of PCT application No. PCT/JP2016/003955 dated Dec. 6, 2016.

International Search Report of PCT application No. PCT/JP2016/003948 dated Nov. 29, 2016.

International Search Report of PCT application No. PCT/JP2016/003952 dated Nov. 1, 2016.

International Search Report of PCT application No. PCT/JP2016/003953 dated Dec. 6, 2016.

International Search Report of PCT application No. PCT/JP2016/003951 dated Nov. 1, 2016.

International Search Report of PCT application No. PCT/JP2016/003950 dated Nov. 29, 2016.

International Search Report of PCT application No. PCT/JP2017/026210 dated Oct. 17, 2017.

M. Holzapfel et al., "Lithium-Ion Conductors of the System LiCo1—xFexO2, Preparation and Structural Investigation," Journal of Solid State Chemistry, 2001, 156, pp. 470-479.

S. Muhammad et al., "Deciphering the thermal behavior of lithium rich cathode material by in situ X-ray diffraction technique," Journal of Power Sources, 2015, 285, pp. 156-160.

International Search Report of PCT application No. PCT/JP2016/003956 dated Dec. 6, 2016.

Non-Final Office Action issued in U.S. Appl. No. 15/821,749, dated Jan. 16, 2020.

Notice of Allowance issued in U.S. Appl. No. 15/821,749, dated Apr. 15, 2020.

Non-Final Office Action issued in U.S. Appl. No. 15/821,745, dated Dec. 10, 2019.

Notice of Allowance issued in U.S. Appl. No. 15/821,745, dated Apr. 8, 2020.

Non-Final Office Action issued in U.S. Appl. No. 15/813,210, dated Jan. 2, 2020.

Non-Final Office Action issued in U.S. Appl. No. 15/813,204, dated Dec. 17, 2019.

Notice of Allowance issued in U.S. Appl. No. 15/813,204, dated Apr. 9, 2020.

Non-Final Office Action issued in U.S. Appl. No. 15/814,874, dated Jan. 2, 2020.

Non-Final Office Action issued in U.S. Appl. No. 15/811,685, dated Dec. 3, 2019.

Notice of Allowance issued in U.S. Appl. No. 15/811,685, dated Apr. 9, 2020.

Non-Final Office Action issued in U.S. Appl. No. 16/278,701, dated Aug. 27, 2019.

Non-Final Office Action issued in U.S. Appl. No. 16/278,701, dated Dec. 10, 2019.

Final Office Action issued in U.S. Appl. No. 16/278,701, dated Apr. 16, 2020.

Non-Final Office Action issued in U.S. Appl. No. 15/813,212, dated Dec. 31, 2019.

Non-Final Office Action issued in U.S. Appl. No. 15/811,683, dated Nov. 15, 2018.

Final Office Action issued in U.S. Appl. No. 15/811,683, dated Apr. 18, 2019.

Notice of Allowance issued in U.S. Appl. No. 15/811,683, dated Aug. 19, 2019.

Non-Final Office Action issued in U.S. Appl. No. 15/811,684, dated Dec. 5, 2019.

Final Office Action issued in U.S. Appl. No. 15/811,684, dated Mar. 13, 2020.

Notice of Allowance issued in U.S. Appl. No. 15/811,684, dated Apr. 8, 2020.

Non-Final Office Action issued in U.S. Appl. No. 15/838,360, dated Feb. 10, 2020.

Non-Final Office Action issued in U.S. Appl. No. 15/813,218, dated Jan. 16, 2020.

Non-Final Office Action issued in U.S. Appl. No. 15/702,632, dated Jun. 17, 2019.

Non-Final Office Action issued in U.S. Appl. No. 15/702,632, dated Nov. 26, 2019.

Final Office Action issued in U.S. Appl. No. 15/702,632, dated Aug. 23, 2019.

Non-Final Office Action issued in U.S. Appl. No. 15/838,360, dated Apr. 22, 2020.

Notice of Allowance issued in U.S. Appl. No. 15/702,632, dated Apr. 20, 2020.

(56) References Cited

OTHER PUBLICATIONS

Notice of Allowance issued in U.S. Appl. No. 15/813,210, dated Apr. 22, 2020.
Notice of Allowance issued in U.S. Appl. No. 15/813,218, dated May 4, 2020.
Notice of Allowance issued in U.S. Appl. No. 15/813,212, dated May 1, 2020.
Notice of Allowance issued in U.S. Appl. No. 15/814,874, dated May 1, 2020.
Shuhua Ren et al., Improved Voltage and Cycling for Intercalation in High-Capacity Disordered Oxyfluoride Cathodes, Advanced Science, Jun. 12, 2015, vol. 2, Issue 10, 1500128.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of $LiNiO_2$—$LiTiO_2$—$[Li1/3Ti2/3]O_2$, Lianqi Zhang, et al Journal of power Sourses, 185(2008), P534-P541.
Written Opinion for Japanese Patent Application No. 2017-540475, dated Sep. 1, 2020; with English translation.

POSITIVE ELECTRODE ACTIVE MATERIAL CONTAINING LITHIUM COMPOSITE OXIDE AND LITHIUM COMPOSITE OXYFLUORIDE, AND BATTERY INCLUDING POSITIVE ELECTRODE CONTAINING POSITIVE ELECTRODE ACTIVE MATERIAL

BACKGROUND

1. Technical Field

The present disclosure relates to a positive electrode active material for batteries and a battery.

2. Description of the Related Art

Japanese Unexamined Patent Application Publication No. 2014-116308 discloses a positive electrode active material including: a lithium-manganese-excess layered composite oxide represented by a chemical formula $Li[Li_{x-z}(Ni_aCo_b Mn_c)_{1-x}]O_{2-y}F_y$, where $a+b+c=1$, $0.05 \leq x \leq 0.33$, $0 \leq y \leq 0.08$, and $0 < z \leq 0.05$; a metalloid fluoride coating layer that is coated on the surface of the composite oxide; and a metalloid phosphate coating layer that is coated on the metalloid fluoride coating layer.

SUMMARY

In one general aspect, the techniques disclosed here feature a positive electrode active material containing a lithium composite oxide and a lithium composite oxyfluoride that covers at least part of the lithium composite oxide. The lithium composite oxyfluoride is represented by a composition formula $Li_\alpha Me2_\beta O_\gamma F_\delta$, where Me2 represents at least one selected from the group consisting of Mn, Co, Ni, Fe, Al, Cu, V, Nb, Mo, Ti, Cr, Zr, Zn, Na, K, Ca, Mg, Pt, Au, Ru, and W; $1.0 \leq \alpha \leq 2.1$; $0.8 \leq \beta \leq 1.3$; $1.5 \leq \gamma \leq 2.9$; and $0.1 \leq \delta \leq 1.5$. The crystal structure of the lithium composite oxyfluoride belongs to space group Fm-3m.

Comprehensive or specific embodiments of the present disclosure may be implemented as a positive electrode active material for batteries, a battery, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
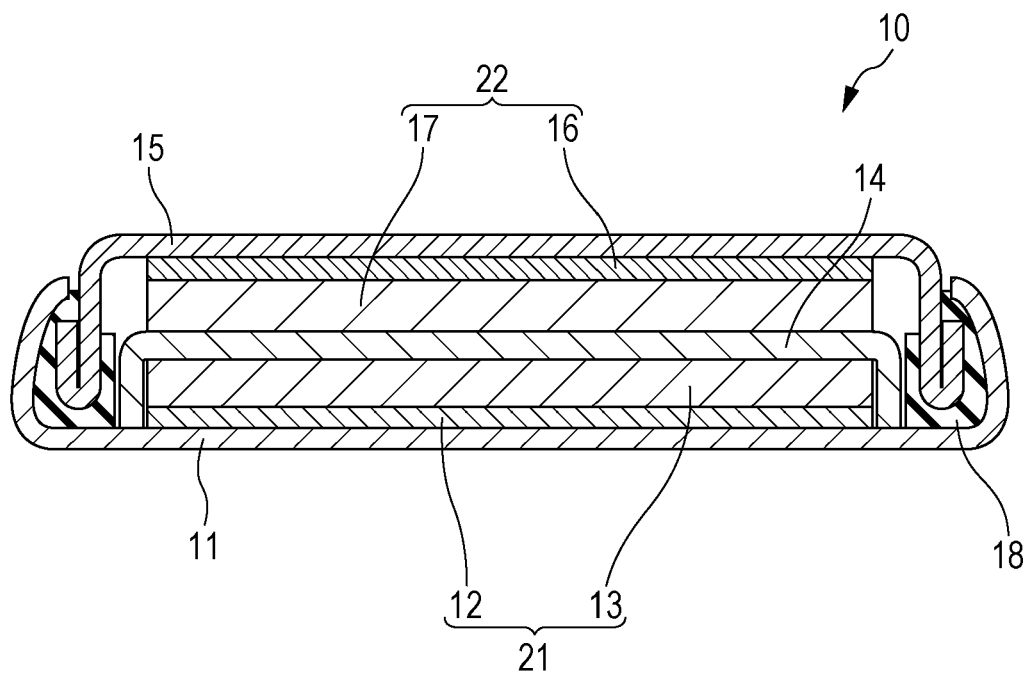
FIG. 1 is a sectional view schematically illustrating a battery that is an example of a battery according to a second embodiment.

Hereafter, embodiments of the present disclosure will be described.

First Embodiment

A positive electrode active material according to a first embodiment contains a lithium composite oxide and a lithium composite oxyfluoride. The lithium composite oxyfluoride covers at least part of the surface of the lithium composite oxide.

This configuration can provide batteries having good cycle characteristics.

The term "batteries having good cycle characteristics" refers to batteries having a relatively high capacity retention even after a charge-discharge cycle is repeatedly performed a plurality of times. In other words, the batteries having good cycle characteristics are batteries whose capacity does not considerably decrease even after a charge-discharge cycle is repeatedly performed a plurality of times.

The phrase "the lithium composite oxyfluoride covers at least part of the surface of the lithium composite oxide" embraces a state in which the lithium composite oxyfluoride is present on at least part of the surface of the lithium composite oxide. Such a state may be, for example, a state in which particles containing the lithium composite oxide and particles containing the lithium composite oxyfluoride are mixed with each other.

A battery using the positive electrode active material according to the first embodiment has better cycle characteristics and higher safety than batteries using a positive electrode active material not containing a lithium composite oxyfluoride. The lithium composite oxyfluoride contains fluorine in its compound and therefore has higher resistance to high voltage than the lithium composite oxide. When the lithium composite oxyfluoride having high resistance to high voltage covers at least part of the surface of the lithium composite oxide, a side reaction that occurs between the surface of the lithium composite oxide and an electrolyte during charge can be suppressed. The amount of heat generated during combustion is also decreased. Thus, batteries having good cycle characteristics and high safety can be provided.

The lithium composite oxyfluoride functions as a positive electrode active material capable of occluding and releasing Li. Therefore, the battery using the positive electrode active material according to the first embodiment is better than batteries whose cycle characteristics are improved by a different method (e.g., a method in which a positive electrode active material is coated with a metalloid fluoride) in terms of capacity and other battery characteristics.

The positive electrode active material according to the first embodiment may contain 0.1 mass % or more and 10 mass % or less of the lithium composite oxyfluoride relative to the lithium composite oxide.

This configuration can provide batteries having better cycle characteristics. At a content of 0.1 mass % or more, the presence of the lithium composite oxyfluoride improves the effect of suppressing a side reaction between the lithium composite oxide and an electrolyte solution. At a content of 10 mass % or less, an increase in the resistance due to the lithium composite oxyfluoride having low electron conductivity can be suppressed.

The positive electrode active material according to the first embodiment may contain 0.5 mass % or more and 10 mass % or less of the lithium composite oxyfluoride relative to the lithium composite oxide.

This configuration can provide batteries having better cycle characteristics.

The positive electrode active material according to the first embodiment may contain 1 mass % or more and 10 mass % or less of the lithium composite oxyfluoride relative to the lithium composite oxide.

This configuration can provide batteries having better cycle characteristics.

The positive electrode active material according to the first embodiment may contain 1 mass % or more and 5 mass % or less of the lithium composite oxyfluoride relative to the lithium composite oxide.

This configuration can provide batteries having better cycle characteristics.

In the positive electrode active material according to the first embodiment, the lithium composite oxyfluoride may form a solid solution with at least part of the surface of the lithium composite oxide.

This configuration can provide batteries having better cycle characteristics because elution (e.g., elimination) of metal elements can be further suppressed.

Herein, the lithium composite oxide according to an embodiment of the present disclosure is a compound containing at least Li and O. The lithium composite oxide may also contain other elements (e.g., transition metals).

The lithium composite oxide may be a publicly known material. For example, the lithium composite oxide may have a layered rock-salt structure that belongs to space group R-3m, a cubic rock-salt structure that belongs to space group Fm-3m, or a spinel structure that belongs to space group Fd-3m. Alternatively, the lithium composite oxide may be, for example, a polyanion material or an olivine compound. The lithium composite oxide may have a structure that belongs to space group Pnma.

The lithium composite oxide according to the first embodiment may be a compound represented by a composition formula (1) below.

$$Li_xMe1_yA_zO_2 \qquad (1)$$

Me1 may represent at least one element selected from the group consisting of Mn, Co, Ni, Fe, Al, Cu, V, Nb, Mo, Ti, Cr, Zr, Zn, Na, K, Ca, Mg, Pt, Au, Ru, and W.

Me1 may represent at least one element selected from the group consisting of Mn, Co, Ni, Fe, Cu, V, Ti, Cr, and Zn, that is, at least one 3d transition metal element.

A may represent at least one element selected from the group consisting of B, P, Si, S, and N.

Furthermore, the following conditions may be satisfied in the composition formula (1).

$$0.5 \leq x \leq 1.34$$

$$0.5 \leq y \leq 1.0$$

$$0 \leq z \leq 0.5$$

$$1.5 \leq x+y+z \leq 2.0$$

This configuration can provide batteries having higher capacity and better cycle characteristics.

In the first embodiment, for example, when Me1 represents two or more elements (e.g., Me1', Me1", and Me1''') and the composition is "Me1'$_{y1}$Me1"$_{y2}$Me1'''$_{y3}$", "y=y1+y2+y3" is satisfied. For example, when Me1 represents two or more elements (Ni, Co, and Al) and the composition is "Ni$_{0.85}$Co$_{0.1}$Al$_{0.05}$", "y=0.85+0.1+0.05=1.0" is given.

When x is 0.5 or more in the compound represented by the composition formula (1), the amount of Li that can be used is increased. This improves the capacity and the cycle characteristics.

When x is 1.34 or less in the compound represented by the composition formula (1), the oxidation-reduction reaction of Me1 can be more utilized. As a result, the oxidation-reduction reaction of oxygen is less utilized. Thus, the crystal structure is stabilized. This improves the capacity and the cycle characteristics.

When y is 0.5 or more in the compound represented by the composition formula (1), the oxidation-reduction reaction of Me1 can be more utilized. As a result, the oxidation-reduction reaction of oxygen is less utilized. Thus, the crystal structure is stabilized. This improves the capacity and the cycle characteristics.

When y is 1.0 or less in the compound represented by the composition formula (1), the amount of Li that can be used is increased. This improves the capacity and the cycle characteristics.

The compound represented by the composition formula (1) does not necessarily contain A, which is an element that readily forms covalent bonds. That is, z=0 may be satisfied. When A is contained (i.e., 0<z), the operating voltage of the battery is improved. Furthermore, A has a low atomic weight and stabilizes a structure when Li is deintercalated. This improves the capacity and the cycle characteristics.

When z is 0.5 or less in the compound represented by the composition formula (1), an increase in the amount of A that does not contribute to the oxidation-reduction reaction can be prevented. This improves the capacity and the cycle characteristics.

When x+y+z is 1.5 or more in the compound represented by the composition formula (1), generation of impurities due to phase separation during the synthesis can be suppressed. Furthermore, an excess increase in the capacity due to the oxidation-reduction reaction of oxygen can be prevented, which stabilizes a structure when Li is deintercalated. This improves the capacity and the cycle characteristics.

When x+y+z is 2.0 or less in the compound represented by the composition formula (1), formation of an anion-deficient structure can be prevented. This stabilizes a crystal structure when Li is deintercalated during charge and improves the efficiency of Li intercalation during discharge. The amount of charge compensation due to the oxidation-reduction reaction of oxygen is increased. This improves the capacity and the cycle characteristics.

In the compound represented by the composition formula (1), Me1 may represent at least one element selected from the group consisting of Mn, Co, Ni, Fe, and Al.

This configuration can provide batteries having higher capacity and better cycle characteristics.

In the compound represented by the composition formula (1), A may represent P.

This configuration can provide batteries having higher capacity and better cycle characteristics.

The lithium composite oxide according to the first embodiment may be a compound represented by LiNi$_{0.85}$Co$_{0.1}$Al$_{0.05}$O$_2$, Li$_2$MnO$_3$, Li$_{1.2}$Mn$_{0.54}$Co$_{0.13}$Ni$_{0.13}$O$_2$, LiCoO$_2$, LiFePO$_4$, or LiMn$_2$O$_4$.

This configuration can provide batteries having higher capacity and better cycle characteristics.

In the case where, for example, a lithium ion battery is produced using LiNi$_{0.85}$Co$_{0.1}$Al$_{0.05}$O$_2$ or LiCoO$_2$, the lithium ion battery may have an oxidation-reduction potential (based on Li/Li$^+$) of about 3.8 V. In the case where a lithium ion battery is produced using Li$_2$MnO$_3$, the lithium ion battery may have an oxidation-reduction potential of about 3.5 V. In the case where a lithium ion battery is produced using $Li_{1.2}Mn_{0.54}Co_{0.13}Ni_{0.13}O_2$, the lithium ion battery may have an oxidation-reduction potential of about 3.6 V. In the case where a lithium ion battery is produced using $LiFePO_4$, the lithium ion battery may have an oxidation-reduction potential of about 3.2 V. In the case where a lithium ion battery is produced using $LiMn_2O_4$, the lithium ion battery may have an oxidation-reduction potential of about 4.0 V.

The lithium composite oxyfluoride according to an embodiment of the present disclosure is a compound containing at least Li, O, and F. The lithium composite oxyfluoride may also contain other elements (e.g., transition metals).

For example, the lithium composite oxyfluoride may be a compound obtained by substituting some oxygen atoms of the above lithium composite oxide with fluorine atoms.

The lithium composite oxyfluoride contains F in its compound. The lithium composite oxyfluoride is an active material that contributes to high discharge capacity or high operating voltage because oxygen is substituted with fluorine, which exhibits high electronegativity.

The lithium composite oxyfluoride according to the first embodiment may be a compound represented by a composition formula (2) below.

$$Li_\alpha Me2_\beta O_\gamma F_\delta \qquad \text{formula (2)}$$

Me2 may represent at least one element selected from the group consisting of Mn, Co, Ni, Fe, Al, Cu, V, Nb, Mo, Ti, Cr, Zr, Zn, Na, K, Ca, Mg, Pt, Au, Ru, and W.

Furthermore, the following conditions may be satisfied in the composition formula (2).

$$1.0 \le \alpha \le 2.1$$

$$0.8 \le \beta \le 1.3$$

$$1.5 \le \gamma \le 2.9$$

$$0.1 \le \delta \le 1.5$$

This configuration can provide batteries having higher capacity and better cycle characteristics.

When $\alpha$ is 1.0 or more in the compound represented by the composition formula (2), the amount of Li that can be used is increased. This improves the capacity and the cycle characteristics.

When $\alpha$ is 2.1 or less in the compound represented by the composition formula (2), the oxidation-reduction reaction of Me2 can be more utilized. As a result, the oxidation-reduction reaction of oxygen is less utilized. Thus, the crystal structure is stabilized. This improves the capacity and the cycle characteristics.

When $\beta$ is 0.8 or more in the compound represented by the composition formula (2), the oxidation-reduction reaction of Me2 can be more utilized. As a result, the oxidation-reduction reaction of oxygen is less utilized. Thus, the crystal structure is stabilized. This improves the capacity and the cycle characteristics.

When $\beta$ is 1.3 or less in the compound represented by the composition formula (2), the amount of Li that can be used is increased. This improves the capacity and the cycle characteristics.

When $\gamma$ is 1.5 or more in the compound represented by the composition formula (2), a decrease in the amount of charge compensation due to the oxidation-reduction reaction of oxygen can be prevented. This improves the capacity and the cycle characteristics.

When $\gamma$ is 2.9 or less in the compound represented by the composition formula (2), an excess increase in the capacity due to the oxidation-reduction reaction of oxygen can be prevented, which stabilizes a structure when Li is deintercalated. This improves the capacity and the cycle characteristics.

When $\delta$ is 0.1 or more in the compound represented by the composition formula (2), the interaction between cations and anions is improved because the influence of F, which exhibits high electronegativity, increases. Thus, a structure is stabilized when Li is deintercalated. This improves the capacity and the cycle characteristics.

When $\delta$ is 1.5 or less in the compound represented by the composition formula (2), an increase in the influence of F, which exhibits high electronegativity, can be prevented. Thus, the electron conductivity is improved. This improves the capacity and the cycle characteristics.

The lithium composite oxyfluoride according to the first embodiment may satisfy the following conditions in the above-described composition formula (2).

$$1.0 \le \alpha \le 2.0$$

$$\beta = 1.0$$

$$1.5 \le \gamma \le 2.0$$

$$0.5 \le \delta \le 1.0$$

This configuration can provide batteries having higher capacity and better cycle characteristics.

When $\delta$ is 0.5 or more in the compound represented by the composition formula (2) (i.e., when the amount of fluorine is large), the redox amount of oxygen can be suppressed. Thus, the elimination of oxygen can be suppressed, which stabilizes the structure. When $\delta$ is 0.5 or more in the compound represented by the composition formula (2), the resistance to high voltage is further improved. Therefore, when $\delta$ is 0.5 or more in the compound represented by the composition formula (2), batteries having higher capacity and better cycle characteristics can be provided.

In the compound represented by the composition formula (2), Li and Me2 are believed to be located at the same site.

In the composition formula (2), the ratio of "Li" and "Me2" is expressed as "$\alpha/\beta$".

Herein, the compound represented by the composition formula (2) may satisfy $1 \le \alpha/\beta \le 2$.

This configuration can provide batteries having higher capacity and better cycle characteristics.

When $\alpha/\beta$ is 1 or more, the ratio of the number of Li atoms at sites at which Li atoms are located is larger than that of a known positive electrode active material represented by, for example, a composition formula $LiCoO_2$. This allows a large number of Li atoms to be intercalated and deintercalated.

When $\alpha/\beta$ is 2 or less, the oxidation-reduction reaction of Me2 can be more utilized. As a result, the oxidation-reduction reaction of oxygen is less utilized. Furthermore, the crystal structure is stabilized when Li is deintercalated during charge, and the efficiency of intercalating Li during discharge is improved.

The above compound represented by the composition formula (2) may satisfy $1 < \alpha/\beta \le 2.0$.

This configuration can provide batteries having higher capacity and better cycle characteristics.

The lithium composite oxyfluoride according to the first embodiment may have a crystal structure that belongs to space group Fm-3m (i.e., rock-salt crystal structure).

This configuration can provide batteries having higher capacity and better cycle characteristics.

Herein, for example, in the case where the lithium composite oxyfluoride has a layered structure that belongs to space group R-3m, the layered structure cannot be maintained when a large number of Li atoms are extracted and thus is easily broken.

In contrast, the crystal structure that belongs to space group Fm-3m can be stably maintained without being broken even when a large number of Li atoms are extracted. Furthermore, in the crystal structure that belongs to space group Fm-3m, elements having different ionic radii are believed to be easily mixed with each other. For these reasons, the lithium composite oxyfluoride having a crystal structure that belongs to space group Fm-3m is suitable for providing batteries having higher capacity and better cycle characteristics.

The lithium composite oxyfluoride according to the first embodiment may be a compound having a crystal structure that belongs to space group Fm-3m and represented by the composition formula (2).

This configuration can provide batteries having higher capacity and better cycle characteristics.

In the compound represented by the composition formula (2), Me2 may represent at least one element selected from the group consisting of Mn, Co, Ni, Fe, Cu, V, Ti, Cr, and Zn, that is, at least one 3d transition metal element.

In the compound represented by the composition formula (2), Me2 may represent one or two elements selected from the group consisting of Mn and Ni.

This configuration can provide batteries having higher capacity and better cycle characteristics.

In the compound represented by the composition formula (2), Me2 may represent Mn.

This configuration can provide batteries having higher capacity and better cycle characteristics.

The lithium composite oxyfluoride according to the first embodiment may be a compound represented by $Li_2MnO_2F$, $LiMnO_{1.5}F_{0.5}$, $Li_2NiO_2F$, or $Li_2Mn_{0.8}Ni_{0.2}O_2F$.

This configuration can provide batteries having higher capacity and better cycle characteristics.

The positive electrode active material according to the first embodiment may contain a lithium composite oxide as a main component (i.e., the mass proportion of a lithium composite oxide in the entire positive electrode active material is 50% or more (50 mass % or more)).

This configuration can provide batteries having higher capacity and better cycle characteristics.

The positive electrode active material according to the first embodiment may contain 70% by mass or more (70 mass % or more) of the lithium composite oxide relative to the entire positive electrode active material.

This configuration can provide batteries having higher capacity and better cycle characteristics.

The positive electrode active material according to the first embodiment may contain 90% by mass or more (90 mass % or more) of the lithium composite oxide relative to the entire positive electrode active material.

This configuration can provide batteries having higher capacity and better cycle characteristics.

The positive electrode active material according to the first embodiment contains the lithium composite oxide and the lithium composite oxyfluoride and may further contain unavoidable impurities.

The positive electrode active material according to the first embodiment contains the lithium composite oxide and the lithium composite oxyfluoride and may further contain at least one selected from the group consisting of a starting material used when the positive electrode active material is synthesized, a by-product, and a decomposition product.

The positive electrode active material according to the first embodiment may contain only the lithium composite oxide and the lithium composite oxyfluoride except for, for example, unavoidable impurities.

This configuration can provide batteries having higher capacity and better cycle characteristics.

Method for Producing Compound

Hereafter, an example of a method for producing the positive electrode active material according to the first embodiment will be described.

The lithium composite oxide can be produced by a publicly known method.

The lithium composite oxide can be produced by, for example, the following method.

A raw material containing Li, a raw material containing Me1, and a raw material containing A are provided.

Examples of the raw material containing Li include oxides such as $Li_2O$ and $Li_2O_2$; salts such as LiF, $Li_2CO_3$, and LiOH; and lithium composite oxides such as $LiMe1O_2$ and $LiMe1_2O_4$.

Examples of the raw material containing Me1 include oxides in various oxidation states, such as $Me1_2O_3$; salts such as $Me1CO_3$ and $Me1NO_3$; hydroxides such as $Me1(OH)_2$ and Me1OOH; and lithium composite oxides such as $LiMe1O_2$ and $LiMe1_2O_4$.

For example, when Me1 represents Mn, examples of the raw material containing Mn include manganese oxides in various oxidation states, such as $MnO_2$ and $Mn_2O_3$; salts such as $MnCO_3$ and $MnNO_3$; hydroxides such as $Mn(OH)_2$ and MnOOH; and lithium composite oxides such as $LiMnO_2$ and $LiMn_2O_4$.

Examples of the raw material containing A include $Li_4AO_4$, $Li_3AO_4$, $LiAO_2$, oxides in various oxidation states, lithium composite oxides, and salts such as $AO_4$.

These raw materials are weighed so as to have, for example, a molar ratio in the composition formula (1). Thus, "x, y, and z" in the composition formula (1) can be changed within the range in the composition formula (1).

The weighed raw materials can be mixed with each other by, for example, a dry process or a wet process and heat-treated in an appropriate atmosphere at an appropriate temperature to obtain a lithium composite oxide.

The composition of the obtained lithium composite oxide can be determined by, for example, inductively coupled plasma (ICP) emission spectrometry, an inert gas fusion-infrared absorption method, and ion chromatography.

Furthermore, by determining the space group of a crystal structure by powder X-ray diffractometry, the lithium composite oxide can be identified.

The lithium composite oxyfluoride can be produced by, for example, the following method.

A raw material containing Li, a raw material containing Me2, and a raw material containing F are provided.

Examples of the raw material containing Li include oxides such as $Li_2O$ and $Li_2O_2$; salts such as LiF, $Li_2CO_3$, and LiOH; and lithium composite oxides such as $LiMe2O_2$ and $LiMe2_2O_4$.

Examples of the raw material containing Me2 include oxides in various oxidation states, such as $Me2_2O_3$; salts such as $Me2CO_3$ and $Me2NO_3$; hydroxides such as $Me2(OH)_2$ and Me2OOH; and lithium composite oxides such as $LiMe2O_2$ and $LiMe2_2O_4$.

For example, when Me2 represents Mn, examples of the raw material containing Mn include manganese oxides in various oxidation states, such as $MnO_2$ and $Mn_2O_3$; salts such as $MnCO_3$ and $MnNO_3$; hydroxides such as $Mn(OH)_2$ and MnOOH; and lithium composite oxides such as $LiMnO_2$ and $LiMn_2O_4$.

Examples of the raw material containing F include LiF and transition metal fluorides.

These raw materials are weighed so as to have, for example, a molar ratio in the composition formula (2). Thus, "α, β, γ, and δ" in the composition formula (2) can be changed within the range in the composition formula (2).

The weighed raw materials are mixed with each other by, for example, a dry process or a wet process and mechanochemically reacted for 10 hours or more to obtain a lithium composite oxyfluoride. For example, a mixer such as a ball mill can be used.

By controlling the raw materials used and the mixing conditions of the raw material mixture, for example, the compound represented by the composition formula (2) can be substantially obtained.

The energy required for mixing the elements can be further decreased by using the lithium composite oxide as a precursor. This provides a high-purity lithium composite oxyfluoride.

The composition of the obtained lithium composite oxyfluoride can be determined by, for example, ICP emission spectrometry, an inert gas fusion-infrared absorption method, and ion chromatography.

Furthermore, by determining the space group of a crystal structure by powder X-ray diffractometry, the lithium composite oxyfluoride can be identified.

As described above, the method for producing a lithium composite oxyfluoride includes a step (a) of providing raw materials and a step (b) of mechanochemically reacting the raw materials to obtain a lithium composite oxyfluoride.

The step (a) may include a step of producing a lithium composite oxide serving as a raw material by a publicly known method.

The step (b) may include a step of mechanochemically reacting the raw materials with a ball mill.

As described above, the lithium composite oxyfluoride can be synthesized by mechanochemically reacting a precursor (e.g., LiF, $Li_2O$, transition metal oxide, and lithium composite oxide) with a planetary ball mill.

Herein, a larger number of Li atoms can be incorporated by controlling the mixing ratio of the precursor.

When the precursor is reacted by a solid phase method, the precursor is decomposed into a more stable compound.

That is, for example, in the production method in which the precursor is reacted by a solid phase method, a lithium composite oxyfluoride having a crystal structure that belongs to space group Fm-3m cannot be obtained.

At least part of the surface of the lithium composite oxide can be covered with the lithium composite oxyfluoride by, for example, the following method.

The lithium composite oxide and the lithium composite oxyfluoride are mixed with each other using an agate mortar. Herein, the coverage with the lithium composite oxyfluoride can be controlled by adjusting the mass ratio of the lithium composite oxide and the lithium composite oxyfluoride.

By covering at least part of the surface of the lithium composite oxide with a lithium composite oxyfluoride that has high oxidation resistance and is capable of deintercalating and intercalating lithium, a long-life battery having good cycle characteristics can be provided without decreasing the initial capacity.

Second Embodiment

Hereafter, a second embodiment will be described. Note that the same description as in the first embodiment will be appropriately omitted to avoid redundancy.

A battery according to the second embodiment includes a positive electrode containing the positive electrode active material according to the first embodiment, a negative electrode, and an electrolyte.

This configuration can provide batteries having good cycle characteristics.

In the battery according to the second embodiment, the positive electrode may include a positive electrode active material layer. Herein, the positive electrode active material layer may contain the positive electrode active material according to the first embodiment as a main component (i.e., the mass proportion of the positive electrode active material in the entire positive electrode active material layer is 50% or more (50 mass % or more)).

This configuration can provide batteries having higher capacity and better cycle characteristics.

Alternatively, in the battery according to the second embodiment, the positive electrode active material layer may contain 70% by mass or more (70 mass % or more) of the positive electrode active material according to the first embodiment relative to the entire positive electrode active material layer.

This configuration can provide batteries having higher capacity and better cycle characteristics.

Alternatively, in the battery according to the second embodiment, the positive electrode active material layer may contain 90% by mass or more (90 mass % or more) of the positive electrode active material according to the first embodiment relative to the entire positive electrode active material layer.

This configuration can provide batteries having higher capacity and better cycle characteristics.

The battery according to the second embodiment can be used for, for example, lithium ion secondary batteries, nonaqueous electrolyte secondary batteries, and all-solid-state batteries.

That is, in the battery according to the second embodiment, the negative electrode may contain, for example, a negative electrode active material capable of occluding and releasing lithium ion. Alternatively, the negative electrode may contain, for example, a material causing lithium metal to be precipitated and dissolved thereon.

In the battery according to the second embodiment, the electrolyte may be, for example, a nonaqueous electrolyte (e.g., nonaqueous electrolyte solution).

In the battery according to the second embodiment, the electrolyte may be, for example, a solid electrolyte.

FIG. 1 is a sectional view illustrating a schematic structure of a battery 10 that is an example of the battery according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with, for example, a nonaqueous electrolyte (e.g., nonaqueous electrolyte solution).

The positive electrode 21, the negative electrode 22, and the separator 14 constitute an electrode assembly.

The electrode assembly is accommodated in the case 11.

The case 11 is sealed using the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., aluminum, stainless steel, or aluminum alloy).

The positive electrode current collector 12 may be omitted, and the case 11 may be used as a positive electrode current collector.

The positive electrode active material layer 13 contains the positive electrode active material according to the first embodiment.

The positive electrode active material layer 13 may optionally contain, for example, additives (e.g., a conductive agent, an ion conductive auxiliary agent, and a binding agent).

The negative electrode 22 includes a negative electrode current collector 16 and a negative electrode active material layer 17 disposed on the negative electrode current collector 16.

The negative electrode current collector 16 is made of, for example, a metal material (e.g., aluminum, stainless steel, or aluminum alloy).

The negative electrode current collector 16 may be omitted, and the sealing plate 15 may be used as a negative electrode current collector.

The negative electrode active material layer 17 contains a negative electrode active material.

The negative electrode active material layer 17 may optionally contain, for example, additives (a conductive agent, an ion conductive auxiliary agent, and a binding agent).

Examples of the negative electrode active material include metal materials, carbon materials, oxides, nitrides, tin compounds, and silicon compounds.

The metal material may be a single metal or an alloy. Examples of the metal material include lithium metals and lithium alloys.

Examples of the carbon material include natural graphite, coke, partially graphitized carbon, carbon fiber, spherical carbon, artificial graphite, and amorphous carbon.

From the viewpoint of capacity density, the negative electrode active material may be silicon (Si), tin (Sn), a silicon compound, or a tin compound. The silicon compound and the tin compound may each be an alloy or a solid solution.

An example of the silicon compound is $SiO_x$ (0.05<x<1.95). A compound (alloy or solid solution) obtained by partly substituting a silicon atom of $SiO_x$ with another element may also be used. The other element is at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (0<x<2), $SnO_2$, and $SnSiO_3$. One tin compound selected from the foregoing may be used alone. Alternatively, two or more tin compounds selected from the foregoing may be used in combination.

The negative electrode active material may have any form. A negative electrode active material having a publicly known form (e.g., particulate form or fibrous form) can be used.

Lithium may be supplied (occluded) to the negative electrode active material layer 17 by any method. Specifically, the method is a method (a) in which lithium is deposited onto the negative electrode active material layer 17 by a gas phase method such as a vacuum deposition method or a method (b) in which a lithium metal foil and the negative electrode active material layer 17 are heated while being in contact with each other. By any of the methods, lithium can be diffused into the negative electrode active material layer 17 using heat. Alternatively, lithium may be electrochemically occluded into the negative electrode active material layer 17. Specifically, a battery is assembled using a negative electrode 22 not containing lithium and a lithium metal foil (positive electrode). Then, the battery is charged so that lithium is occluded into the negative electrode 22.

Examples of the binding agent for the positive electrode 21 and the negative electrode 22 include polyvinylidene fluoride, polytetrafluoroethylene, polyethylene, polypropylene, aramid resin, polyamide, polyimide, polyamide-imide, polyacrylonitrile, polyacrylic acid, poly(methyl acrylate), poly(ethyl acrylate), poly(hexyl acrylate), polymethacrylic acid, poly(methyl methacrylate), poly(ethyl methacrylate), poly(hexyl methacrylate), polyvinyl acetate, polyvinylpyrrolidone, polyether, polyether sulfone, hexafluoropolypropylene, styrene-butadiene rubber, and carboxymethyl cellulose. Alternatively, the binding agent may be a copolymer of two or more materials selected from the group consisting of tetrafluoroethylene, hexafluoroethane, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. The binding agent may be a mixture of two or more materials selected from the foregoing materials.

Examples of the conductive agent for the positive electrode 21 and the negative electrode 22 include graphite, carbon black, conductive fibers, graphite fluoride, metal powder, conductive whiskers, conductive metal oxides, and organic conductive materials. Examples of the graphite include natural graphite and artificial graphite. Examples of the carbon black include acetylene black, Ketjenblack (registered trademark), channel black, furnace black, lamp black, and thermal black. An example of the metal powder is aluminum powder. Examples of the conductive whiskers include zinc oxide whiskers and potassium titanate whiskers. An example of the conductive metal oxides is titanium oxide. An example of the organic conductive materials is a phenylene derivative.

The separator 14 may be made of a material having high ion permeability and sufficient mechanical strength. Examples of the material include microporous thin films, woven fabric, and nonwoven fabric. Specifically, the separator 14 is desirably made of a polyolefin such as polypropylene or polyethylene. The separator 14 made of a polyolefin has not only high durability, but also a shutdown function exhibited when excessively heated. The separator 14 has a thickness of, for example, 10 to 300 μm (or 10 to 40 μm). The separator 14 may be a single-layer film made of one material. Alternatively, the separator 14 may be a composite film (multilayer film) made of two or more materials. The separator 14 has a porosity of, for example, 30% to 70% (or 35% to 60%). The term "porosity" refers to a proportion of the volume of pores to the total volume of the separator 14. The "porosity" is measured by, for example, mercury intrusion.

The nonaqueous electrolyte solution contains a nonaqueous solvent and a lithium salt dissolved in the nonaqueous solvent.

Examples of the nonaqueous solvent include cyclic carbonate solvents, linear carbonate solvents, cyclic ether solvents, linear ether solvents, cyclic ester solvents, linear ester solvents, and fluorinated solvents.

Examples of the cyclic carbonate solvents include ethylene carbonate, propylene carbonate, and butylene carbonate.

Examples of the linear carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the linear ether solvents include 1,2-dimethoxyethane and 1,2-diethoxyethane.

An example of the cyclic ester solvents is γ-butyrolactone.

An example of the linear ester solvents is methyl acetate.

Examples of the fluorinated solvents include fluoroethylene carbonate, fluoromethyl propionate, fluorobenzene, fluoroethyl methyl carbonate, and fluorodimethylene carbonate.

One nonaqueous solvent selected from the foregoing solvents may be used alone. Alternatively, two or more nonaqueous solvents selected from the foregoing solvents may be used in combination.

The nonaqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

When these fluorinated solvents are contained in the nonaqueous electrolyte solution, the oxidation resistance of the nonaqueous electrolyte solution is improved.

As a result, even when the battery 10 is charged at high voltage, the battery 10 can be stably operated.

In the battery according to the second embodiment, the electrolyte may be a solid electrolyte.

Examples of the solid electrolyte include organic polymer solid electrolytes, oxide solid electrolytes, and sulfide solid electrolytes.

An example of the organic polymer solid electrolytes is a compound of a polymer compound and a lithium salt.

The polymer compound may have an ethylene oxide structure. In this case, a large amount of the lithium salt can be contained, which further improves the ionic conductivity.

Examples of the oxide solid electrolytes include NASICON solid electrolytes such as $LiTi_2(PO_4)_3$ and its element-substituted derivatives; $(LaLi)TiO_3$-based perovskite solid electrolytes; LISICON solid electrolytes such as $Li_{14}ZnGe_4O_{16}$, $Li_4SiO_4$, $LiGeO_4$, and their element-substituted derivatives; garnet solid electrolytes such as $Li_7La_3Zr_2O_{12}$ and its element-substituted derivatives; $Li_3N$ and its H-substituted derivatives; and $Li_3PO_4$ and its N-substituted derivatives.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Furthermore, LiX (X: F, Cl, Br, or I), $MO_y$, $Li_xMO_y$ (M: P, Si, Ge, B, Al, Ga, or In) (x and y: natural number), or the like may be added to the foregoing sulfide solid electrolytes.

In particular, among these solid electrolytes, sulfide solid electrolytes have excellent formability and high ionic conductivity. Therefore, the use of the sulfide solid electrolytes can provide a battery with higher energy density.

Among the sulfide solid electrolytes, $Li_2S$—$P_2S_5$ has high electrochemical stability and higher ionic conductivity. Therefore, the use of $Li_2S$—$P_2S_5$ as a solid electrolyte can provide a battery with higher energy density.

A solid electrolyte layer may contain the above-described nonaqueous electrolyte solution.

When a solid electrolyte layer contains the nonaqueous electrolyte solution, lithium ion transfer is facilitated between the active material and the solid electrolyte. This can provide a battery with higher energy density.

The solid electrolyte layer may contain, for example, a gel electrolyte and an ionic liquid in addition to the solid electrolyte.

The gel electrolyte may be a polymer material containing a nonaqueous electrolyte solution. Examples of the polymer material include polyethylene oxide, polyacrylonitrile, polyvinylidene fluoride, poly(methyl methacrylate), and polymers having an ethylene oxide bond.

Examples of cations for the ionic liquid include chain aliphatic quaternary salts such as tetraalkylammoniums and tetraalkylphosphoniums; alicyclic ammoniums such as pyrrolidiniums, morpholiniums, imidazoliniums, tetrahydropyrimidiniums, piperaziniums, and piperidiniums; and nitrogen-containing heterocyclic aromatic cations such as pyridiniums and imidazoliums. Examples of anions for the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from the foregoing lithium salts may be used alone. Alternatively, two or more lithium salts selected from the foregoing lithium salts may be used as a mixture. The concentration of the lithium salt is, for example, in the range of 0.5 to 2 mol/L.

The battery according to the second embodiment may have various forms. For example, coin batteries, cylinder batteries, prismatic batteries, sheet batteries, button batteries, flat batteries, and stack batteries may be employed.

EXAMPLES

Example 1

Production of Lithium Composite Oxide $LiOH \cdot H_2O$ and $Ni_{0.85}Co_{0.1}Al_{0.05}(OH)_2$ were weighed so as to have a molar ratio of Li/(Ni+Co+Al)=1.

The weighed raw materials were mixed with each other using an agate mortar and then fired in an oxygen stream at 750° C. for 12 hours.

The produced lithium composite oxide was subjected to powder X-ray diffractometry.

The space group of the produced lithium composite oxide was R-3m.

The composition of the produced lithium composite oxide was determined by ICP emission spectrometry, an inert gas fusion-infrared absorption method, and ion chromatography.

As a result, the produced lithium composite oxide had a composition of $LiNi_{0.85}Co_{0.1}Al_{0.05}O_2$.

Production of Lithium Composite Oxyfluoride

LiF and $LiMnO_2$ were weighed so as to have a molar ratio of Li/Mn/O/F=2/1/2/1.

The weighed raw materials were inserted into a 45 cc zirconia container together with an appropriate amount of ϕ3 mm zirconia balls, and the container was hermetically sealed in an argon glove box.

The container was taken out of the argon glove box and treated with a planetary ball mill at 600 rpm for 30 hours.

The produced lithium composite oxyfluoride was subjected to powder X-ray diffractometry.

Figure 2:
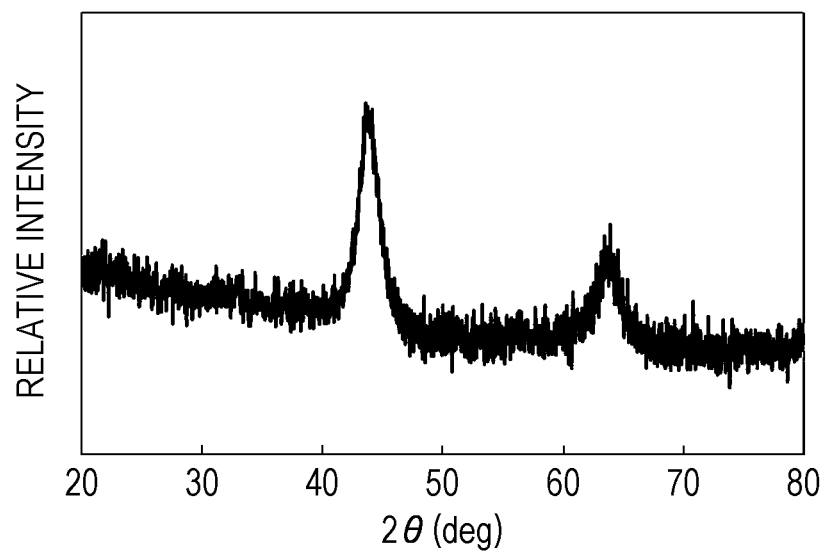
FIG. 2 is a powder X-ray diffraction chart of a lithium composite oxyfluoride used in Example 1.

FIG. 2 illustrates the measurement results.

The space group of the produced lithium composite oxyfluoride was Fm-3m.

The composition of the produced lithium composite oxyfluoride was determined by ICP emission spectrometry, an inert gas fusion-infrared absorption method, and ion chromatography.

As a result, the produced lithium composite oxyfluoride had a composition of $Li_2MnO_2F$.

Production of Positive Electrode Active Material

The produced lithium composite oxide and the produced lithium composite oxyfluoride were weighed at a mass ratio of 100:5 (i.e., the lithium composite oxyfluoride was contained in an amount of 5 mass % relative to the lithium composite oxide) and mixed with each other using an agate mortar for 10 minutes to produce a positive electrode active material.

The produced positive electrode active material was subjected to powder X-ray diffractometry.

Figure 3:
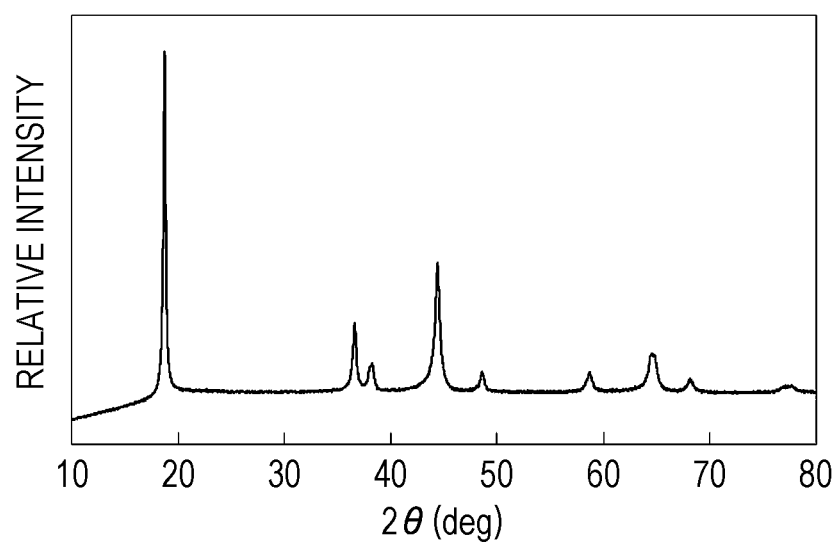
FIG. 3 is a powder X-ray diffraction chart of a positive electrode active material in Example 1.

FIG. 3 illustrates the measurement results.

The surface of the produced positive electrode active material was observed with a transmission electron microscope.

As a result, the lithium composite oxyfluoride covered 8% of the entire surface of the lithium composite oxide.

Production of Battery

Subsequently, 70 parts by mass of the positive electrode active material, 20 parts by mass of a conductive agent, 10 parts by mass of polyvinylidene fluoride (PVDF), and an appropriate amount of 2-methylpyrrolidone (NMP) were mixed with each other. Thus, a positive electrode mixture slurry was prepared.

The positive electrode mixture slurry was applied onto one surface of a positive electrode current collector having a thickness of 20 μm and formed of an aluminum foil.

The positive electrode mixture slurry was dried and rolling was performed to obtain a positive electrode plate including a positive electrode active material layer and having a thickness of 60 μm.

The obtained positive electrode plate was stamped into a circular shape with a diameter of 12.5 mm to obtain a positive electrode.

Furthermore, a lithium metal foil having a thickness of 300 μm was stamped into a circular shape with a diameter of 14.0 mm to obtain a negative electrode.

Fluoroethylene carbonate (FEC), ethylene carbonate (EC), and ethyl methyl carbonate (EMC) were mixed at a volume ratio of 1:1:6 to obtain a nonaqueous solvent.

$LiPF_6$ was dissolved in the nonaqueous solvent in a concentration of 1.0 mol/L to obtain a nonaqueous electrolyte solution.

A separator (manufactured by Celgard, LLC., product number: 2320, thickness: 25 μm) was impregnated with the obtained nonaqueous electrolyte solution. The separator is a three-layer separator including a polypropylene layer, a polyethylene layer, and a polypropylene layer.

The positive electrode, the negative electrode, and the separator were assembled in a dry box in which the dew point was controlled to −50° C., and thus a CR2032 coin battery was produced.

Examples 2 to 11

The compositions and the mass ratio of the lithium composite oxide and the lithium composite oxyfluoride in Example 1 were changed to those listed in Table 1.

Regarding the produced lithium composite oxide, $LiNi_{0.85}Co_{0.1}Al_{0.05}O_2$ and $LiCoO_2$ had a space group of R-3m, $Li_2MnO_3$ and $Li_{1.2}Mn_{0.54}Co_{0.13}Ni_{0.13}O_2$ had a space group of C2/m, and $LiFePO_4$ had a space group of Pnma.

Regarding the produced lithium composite oxyfluoride, $Li_2MnO_2F$, $LiMnO_{1.5}F_{0.5}$, $Li_2NiO_2F$, and $Li_2Mn_{0.8}No_{0.2}O_2F$ had a space group of Fm-3m.

Positive electrode active materials in Examples 2 to 11 were synthesized in the same manner as in Example 1 except for the above changes.

Coin batteries in Examples 2 to 11 were produced in the same manner as in Example 1 using the positive electrode active materials in Examples 2 to 11.

Comparative Example 1

A lithium composite oxide ($LiNi_{0.85}Co_{0.1}Al_{0.05}O_2$) was produced in the same manner as in Example 1. Note that the lithium composite oxyfluoride was not used.

A coin battery in Comparative Example 1 was produced in the same manner as in Example 1 using the produced lithium composite oxide as a positive electrode active material.

Comparative Examples 2 to 5

The composition of the lithium composite oxide in Comparative Example 1 was changed to those listed in Table 1. Positive electrode active materials in Comparative Examples 2 to 5 were synthesized in the same manner as in Comparative Example 1 except for the above change.

Coin batteries in Comparative Examples 2 to 5 were produced in the same manner as in Example 1 using the positive electrode active materials in Comparative Examples 2 to 5.

Evaluation of Battery

The current density at the positive electrode was set to 0.2 $mA/cm^2$ and the end-of-charge voltage was set to 4.3 V. The batteries in Example 1 and Comparative Example 1 were charged.

Then, the end-of-discharge voltage was set to 2.5 V, and the batteries in Example 1 and Comparative Example 1 were discharged at a current density of 0.2 $mA/cm^2$.

Under the above charge-discharge conditions, 35 cycles of charge and discharge were repeatedly performed.

The capacity retentions of the batteries in the 35 cycles of charge and discharge were measured.

Figure 4:
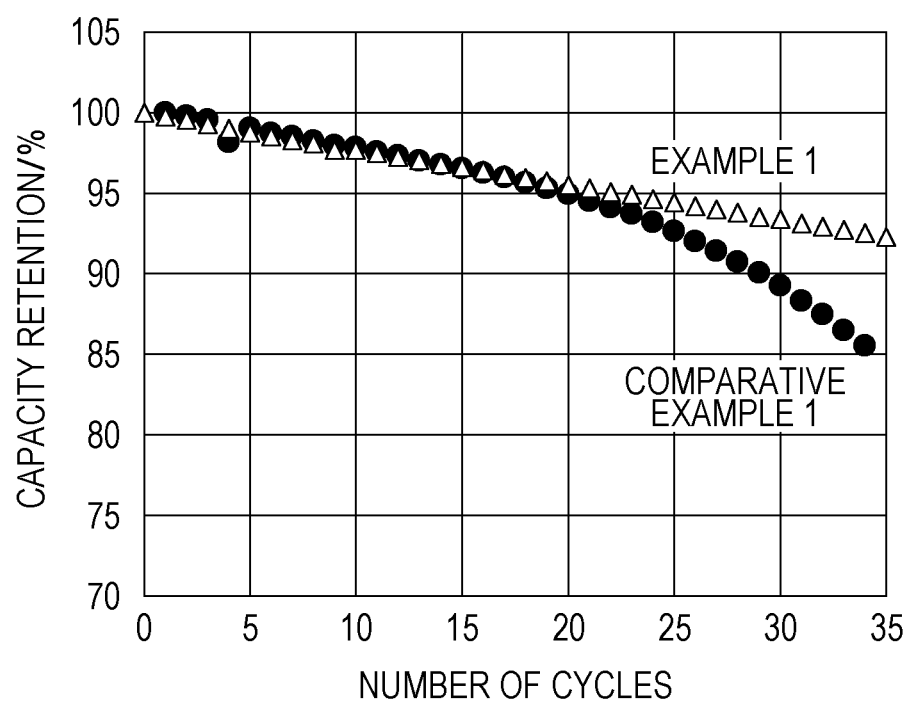
FIG. 4 illustrates the results of a charge-discharge cycle test of batteries in Example 1 and Comparative Example 1.

FIG. 4 illustrates the measurement results.

The capacity retention after 35 cycles of the battery in Example 1 was 93%.

The capacity retention after 35 cycles of the battery in Comparative Example 1 was 85%.

The capacity retentions after 35 cycles of the batteries in Examples 2 to 11 and Comparative Examples 2 to 5 were measured in the same manner as in Example 1 and Comparative Example 1, except that the end-of-charge voltage was set to 4.7 V in Examples 8 and 9 and Comparative Examples 2 and 3 and 3.6 V in Example 11 and Comparative Example 5.

Table 1 shows the results.

As shown in Table 1, the initial discharge capacities of the batteries in Examples 1 to 11 that use the positive electrode active materials containing the lithium composite oxides and the lithium composite oxyfluorides do not decrease compared with the initial discharge capacities of the batteries in Comparative Examples 1 to 5 that use the positive electrode active materials containing only the lithium composite oxides having the corresponding compositions.

TABLE 1

| Sample | Lithium composite oxide | Lithium composite oxyfluoride | Mass ratio (mass %) | Initial discharge capacity (mAh/g) | Capacity retention after 35 cycles (%) |
|---|---|---|---|---|---|
| Example 1 | $LiNi_{0.85}Co_{0.1}Al_{0.05}O_2$ | $Li_2MnO_2F$ | 5 | 215 | 93 |
| Example 2 | $LiNi_{0.85}Co_{0.1}Al_{0.05}O_2$ | $LiMnO_{1.5}F_{0.5}$ | 5 | 215 | 91 |
| Example 3 | $LiNi_{0.85}Co_{0.1}Al_{0.05}O_2$ | $Li_2NiO_2F$ | 5 | 215 | 89 |
| Example 4 | $LiNi_{0.85}Co_{0.1}Al_{0.05}O_2$ | $Li_2Mn_{0.8}Ni_{0.2}O_2F$ | 5 | 215 | 91 |
| Example 5 | $LiNi_{0.85}Co_{0.1}Al_{0.05}O_2$ | $Li_2MnO_2F$ | 0.5 | 215 | 87 |
| Example 6 | $LiNi_{0.85}Co_{0.1}Al_{0.05}O_2$ | $Li_2MnO_2F$ | 1 | 215 | 90 |
| Example 7 | $LiNi_{0.85}Co_{0.1}Al_{0.05}O_2$ | $Li_2MnO_2F$ | 10 | 215 | 87 |
| Example 8 | $Li_2MnO_3$ | $Li_2MnO_2F$ | 1 | 248 | 75 |
| Example 9 | $Li_{1.2}Mn_{0.54}Co_{0.13}Ni_{0.13}O_2$ | $Li_2MnO_2F$ | 1 | 278 | 89 |
| Example 10 | $LiCoO_2$ | $Li_2MnO_2F$ | 1 | 152 | 96 |
| Example 11 | $LiFePO_4$ | $Li_2MnO_2F$ | 1 | 164 | 99 |
| Comparative Example 1 | $LiNi_{0.85}Co_{0.1}Al_{0.05}O_2$ | — | — | 215 | 85 |
| Comparative Example 2 | $Li_2MnO_3$ | — | — | 248 | 62 |
| Comparative Example 3 | $Li_{1.2}Mn_{0.54}Co_{0.13}Ni_{0.13}O_2$ | — | — | 278 | 85 |
| Comparative Example 4 | $LiCoO_2$ | — | — | 152 | 94 |
| Comparative Example 5 | $LiFePO_4$ | — | — | 164 | 98 |

As shown in Table 1, the capacity retentions after 35 cycles of the batteries in Examples 1 to 11 that use the positive electrode active materials containing the lithium composite oxides and the lithium composite oxyfluorides are higher than the capacity retentions after 35 cycles of the batteries in Comparative Examples 1 to 5 that use the positive electrode active materials containing only the lithium composite oxides having the corresponding compositions.

That is, the capacity retentions after 35 cycles of the batteries in Examples 1 to 7 are higher than the capacity retention after 35 cycles of the battery in Comparative Example 1.

The capacity retention after 35 cycles of the battery in Example 8 is higher than the capacity retention after 35 cycles of the battery in Comparative Example 2.

The capacity retention after 35 cycles of the battery in Example 9 is higher than the capacity retention after 35 cycles of the battery in Comparative Example 3.

The capacity retention after 35 cycles of the battery in Example 10 is higher than the capacity retention after 35 cycles of the battery in Comparative Example 4.

The capacity retention after 35 cycles of the battery in Example 11 is higher than the capacity retention after 35 cycles of the battery in Comparative Example 5.

This may be because, in Examples 1 to 11, the lithium composite oxyfluoride having high voltage endurance covers at least part of the surface of the lithium composite oxide, thereby suppressing the side reaction between the surface of the lithium composite oxide and the electrolyte solution during charge. Thus, the cycle characteristics are believed to be improved.

This may be because the lithium composite oxyfluoride is contained in Examples 1 to 11. The lithium composite oxyfluoride is capable of occluding and releasing Li. That is, the lithium composite oxyfluoride has a function as a positive electrode active material. This is believed to improve the cycle characteristics and maintain the initial discharge capacity.

As shown in Table 1, the capacity retention after 35 cycles of the battery in Example 2 is lower than the capacity retention after 35 cycles of the battery in Example 1.

This may be because the Li/Mn molar ratio of the lithium composite oxyfluoride in Example 2 is lower than that in Example 1. This is believed to destabilize the structure during charge and degrade the cycle characteristics.

As shown in Table 1, the capacity retentions after 35 cycles of the batteries in Examples 3 and 4 are lower than the capacity retention after 35 cycles of the battery in Example 1.

This may be because, in Examples 3 and 4, nickel is used as Me2 of the lithium composite oxyfluoride. Nickel does not easily cause orbital hybridization with oxygen in the crystal structure compared with manganese, and thus the elimination of oxygen during charge is facilitated. This is believed to destabilize the structure and degrade the cycle characteristics.

As shown in Table 1, the capacity retention after 35 cycles of the battery in Example 3 is lower than the capacity retention after 35 cycles of the battery in Example 4.

This may be because, in Example 3, only nickel is used as Me2 of the lithium composite oxyfluoride. This is believed to destabilize the structure and degrade the cycle characteristics.

As shown in Table 1, the capacity retentions after 35 cycles of the batteries in Examples 5 and 6 are lower than the capacity retention after 35 cycles of the battery in Example 1.

This may be because the amount of lithium composite oxyfluoride added is smaller in Examples 5 and 6 than in Example 1. This is believed to reduce the effect of suppressing the side reaction with the electrolyte solution and degrade the cycle characteristics.

As shown in Table 1, the capacity retention after 35 cycles of the battery in Example 5 is lower than the capacity retention after 35 cycles of the battery in Example 6.

This may be because the amount of lithium composite oxyfluoride added is smaller in Example 5 than in Example 6. This is believed to reduce the effect of suppressing the side reaction with the electrolyte solution and degrade the cycle characteristics.

As shown in Table 1, the capacity retention after 35 cycles of the battery in Example 7 is lower than the capacity retention after 35 cycles of the battery in Example 1.

This may be because a larger amount of a lithium composite oxyfluoride having low electron conductivity is added in Example 7 than in Example 1. This is believed to increase the resistance and thus degrade the cycle characteristics.

In the above results, it can be expected that the same results are produced even when Me1 is substituted with an element other than Mn, Co, Ni, Fe, and Al and A is substituted with an element other than P in the lithium composite oxide represented by the composition formula $Li_xMe1_yA_zO_2$.

In the above results, it can also be expected that the same results are produced even when Me2 is substituted with an element other than Mn and Ni in the lithium composite oxyfluoride represented by the composition formula $Li_\alpha Me2_\beta O_\gamma F_\delta$.

The positive electrode active material according to an embodiment of the present disclosure can be used as a positive electrode active material for batteries such as secondary batteries.

What is claimed is:

1. A positive electrode active material comprising:
   a lithium composite oxide; and
   a lithium composite oxyfluoride covering at least part of the lithium composite oxide, wherein
   the lithium composite oxyfluoride is represented by a composition formula $Li_\alpha Me2_\beta O_\gamma F_\delta$, where Me2 represents at least one selected from the group consisting of Mn, Co, Ni, Fe, Al, Cu, V, Nb, Mo, Ti, Cr, Zr, Zn, Na, K, Ca, Mg, Pt, Au, Ru, and W; $1.0 \leq \alpha \leq 2.1$; $0.8 \leq \beta \leq 1.3$; $1.5 \leq \gamma \leq 2.9$; and $0.1 \leq \delta \leq 1.5$, and
   a crystal structure of the lithium composite oxyfluoride belongs to space group FM-3M,
   wherein a mass ratio of the lithium composite oxyfluoride to the lithium composite oxide is 0.001 or more and 0.1 or less.

2. The positive electrode active material according to claim 1,
   wherein the mass ratio is 0.01 or more and 0.05 or less.

3. The positive electrode active material according to claim 1,
   wherein the lithium composite oxide is represented by a composition formula $Li_xMe1_yA_zO_2$, where Me1 represents at least one selected from the group consisting of Mn, Co, Ni, Fe, Al, Cu, V, Nb, Mo, Ti, Cr, Zr, Zn, Na, K, Ca, Mg, Pt, Au, Ru, and W; A represents at least one selected from the group consisting of B, P, Si, S, and N; $0.5 \leq x \leq 1.34$; $0.5 \leq y \leq 1.0$; $0 \leq z \leq 0.5$; and $1.5 \leq x+y+z \geq 2.0$.

4. The positive electrode active material according to claim 1,
   wherein $1.0 \leq \alpha \leq 2.0$, $\beta=1.0$, $1.5 \leq \gamma \leq 2.0$, and $0.5 \leq \delta \leq 1.0$.

5. The positive electrode active material according to claim 1,
   wherein Me2 includes at least one selected from the group consisting of Mn, Co, Ni, Fe, Cu, V, Ti, Cr, and Zn as an essential component.

6. The positive electrode active material according to claim 1,
   wherein Me2 includes at least one selected from the group consisting of Mn and Ni as an essential component.

7. The positive electrode active material according to claim 1,
   wherein the mass proportion of the lithium composite oxide in the positive electrode active material is 50% or more.

8. The positive electrode active material according to claim 1,
   wherein the positive electrode active material is a mixture of a plurality of first particles containing the lithium composite oxide and a plurality of second particles containing the lithium composite oxyfluoride, and
   at least one of the plurality of first particles is in direct contact with at least one of the plurality of second particles.

9. A battery comprising:
   a positive electrode containing the positive electrode active material according to claim 1;
   a negative electrode; and
   an electrolyte.

10. The battery according to claim 9,
    wherein the positive electrode includes a positive electrode active material layer containing the positive electrode active material as a main component.

11. The battery according to claim 9,
    wherein the negative electrode includes:
    a negative electrode active material into and from which lithium ion is reversibly occluded and released; or
    a material on which lithium metal is reversibly precipitated and dissolved, and the electrolyte is a nonaqueous electrolyte solution.

12. The battery according to claim 9,
    wherein the negative electrode includes:
    a negative electrode active material into and from which lithium ion is reversibly occluded and released; or
    a material on which lithium metal is reversibly precipitated and dissolved, and the electrolyte is a solid electrolyte.

* * * * *